Nov. 22, 1955
W. R. MERCER
2,724,297
SELF-RETAINING SWIVEL FOOT
Filed Oct. 1, 1952
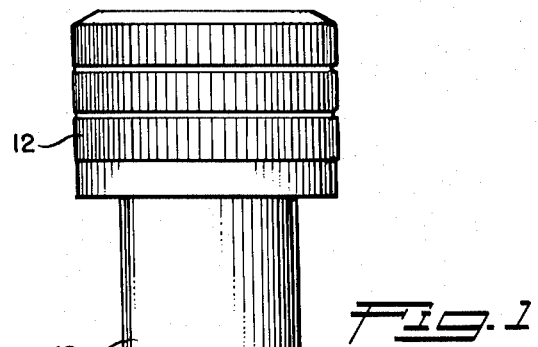
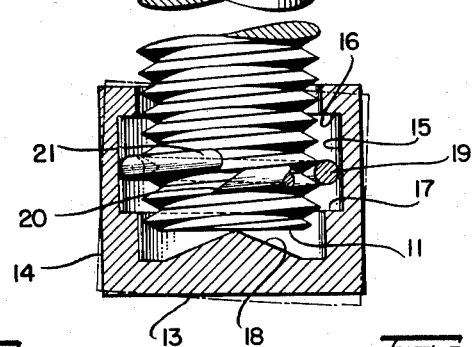
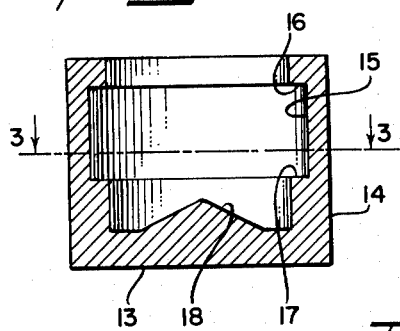
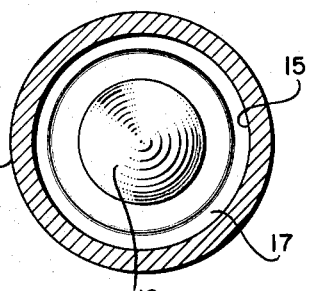
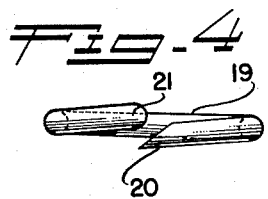
*INVENTOR.*
WARREN R. MERCER
BY
Agent 2,724,297
Patented Nov. 22, 1955

2,724,297

SELF-RETAINING SWIVEL FOOT

Warren R. Mercer, Tujunga, Calif., assignor to Lockheed Aircraft Corporation, Burbank, Calif.

Application October 1, 1952, Serial No. 312,444

4 Claims. (Cl. 81—40)

This invention relates to a swiveling and self aligning pressure foot applicable to the threaded ends of standard set or clamp screws to prevent marring the surfaces of a work piece engaged thereby.

In mounting work pieces in dies or fixtures releasable clamps and adjustable stops are used to clamp and hold or locate the work piece in place for further operations thereon such as drilling. The best known example of such clamps are C clamps in which a swivel foot has a ball joint or loose connection to the end of the clamp screw. This arrangement requires that standard set screws be reworked with a ball end or a groove near the end. In production tooling and fixtures special clamping arrangements are made which apply and retract adjustable set screws with swivel feet, and positioning set screws may be built into the fixture. In such cases the swivel feet must be applied to the set screws after the latter have been threaded into working position. It is accordingly an important object of this invention to provide swivel feet that can be applied to the threaded standard ends of set screws and the like after the latter are in position, without prior alteration or reworking of such standard set screws; and in which the swivel feet are self retaining in position when once applied to the threaded end of such standard screws.

It is a further object of this invention to provide a swivel foot of the type described that can be applied to the threaded end of standard or stock machine screws and when so applied will be freely rotatable and angularly adjustable relative to the axis of the screw, yet strongly retained in position thereon to prevent accidental separation from the screw.

It is a further object of this invention to provide a pressure foot of the type described having an internal channel containing a spring helix that can readily be screwed on to the threaded end of a standard machine screw and retained thereon by the helix engaging an end wall of the channel while being freely rotatable therein.

Other and further objects of this invention will become apparent from a perusal of the accompanying description and drawings showing a preferred embodiment of my invention, wherein:

Figure 1 shows a standard machine screw with the device of this invention applied thereto and shown in section to better illustrate the details thereof Figure 2 is a section of the swivel foot corresponding to the showing of Figure 1, the retainer wire not being installed therein Figure 3 is a section on the line 3—3 of Figure 2

Figure 4 is a view of the retainer wire or spring helix prior to insertion in the foot of Figure 2.

As shown in the drawing:

A standard form of machine screw is indicated in Figure 1, having a threaded shank 10 with a flat end 11 and a head 12 which may be of any suitable form. The head chosen for illustration is a standard form known as a knurled Allen head with an internal wrenching socket (not shown), such a head being convenient where space considerations do not permit the use of a wing nut or thumb screw as commonly found on C clamps.

The preferred form of the swivel foot of this invention consists of a cup-like member having a flat base 13 and cylindrical walls 14, the walls having an internal groove or channel 15 formed therein which forms an inturned upper and a square lower shoulder 16 and 17 interiorly of the cup. The inside of the base 13 is formed with an upwardly convex cone or dome 18 to centrally contact the flat end of the screw so that the screw will bear on the point of the dome 13 even if the work surface against which the foot bears is not exactly normal to the thread axis. This arrangement allows the foot to rock on the end of the screw; and the same result could obviously be obtained by using a rounded or pointed screw end and omitting the dome in the foot. However, although such screws are also standard, or stock items, it is undesirable to have to stock both varieties and therefore I prefer to utilize the more common flat ended screws. It may be well to note at this point that such flat ended screws are not truly flat but that the operation of cutting or rolling the threads on the screw displaces metal around the edges of the flat end surface, which displaced metal does not drag over the dome 18.

A split retainer ring 19, best shown in Figure 4, is formed from resilient material such as spring wire, in the shape of a helix resembling approximately one convolution of a wound spring of the same pitch or spacing as the threads of the screw 10. This retainer is intended to snugly fit the threads of the screw 10 so as to normally revolve therewith in the channel 15 and the wire diameter is such as to engage the shoulders 16 or 17 formed by the groove. The lower end of the split wing 19 is sharpened at 20 to catch on the lower shoulder 17 when the screw is being inserted into the foot and ring, thus screwing the ring onto the screw 10. The other upper end 21 of the split ring is preferably rounded to prevent it from catching and climbing over the shoulder 16 if an attempt is made to unscrew the foot from the screw.

When the foot is to be applied to the screw threads it is both pushed and screwed on the screw, the sharpened end 20 of the split ring then dragging into the lower shoulder 17 to hold the split ring stationary while the screw threads itself into the helix formed by the split ring. The lower shoulder 17 is preferably located so that at least one full thread of the screw will pass through the split ring before the end of the screw bottoms on the dome 18, and the groove 15 is of sufficient width and depth to provide both angular and longitudinal movement of the foot on the screw.

Having described only typical forms of the invention I do not wish to be limited to the specific details herein set forth, but wish to reserve to ourselves any variations or modifications that may appear to those skilled in the art and/or fall within the scope of the following claims.

I claim as my invention:

1. A self-retaining swivel foot for clamp screws and the like comprising in combination a cup-like foot member having cylindrical walls with a channel therein and an externally flat bottom with a central internal dome thereon, the cup walls being of a size to loosely pass over the threads of the screw with the end of the screw bearing against the dome on the bottom of the cup-like foot member, and a resilient split ring retainer in the channel in the cup walls, said split ring retainer being of such size as to engage the threads of the screw when the latter is inserted in the cup.

2. A device as set forth in claim 1 wherein the split ring retainer is formed from approximately one convolution of a coiled spring.

3. A device as set forth in claim 1 wherein one end of the split ring retainer is sharpened to facilitate entry of the screw by engaging the bottom shoulder of the channel in the walls of the cup-like foot.

4. A device as set forth in claim 1 wherein the split ring is of such size as to closely engage the thread of the screw and loosely fit into the channel in the cup-like foot.

References Cited in the file of this patent

UNITED STATES PATENTS

| | | |
|---|---|---|
| 1,387,996 | Menger | Aug. 16, 1921 |
| 1,499,596 | Russell | July 1, 1924 |
| 2,128,938 | Hall et al. | Sept. 6, 1938 |